Figure 1A:
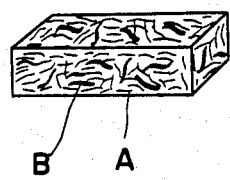

United States Patent [19]

Hagiwara et al.

[11] Patent Number: 4,495,074

[45] Date of Patent: Jan. 22, 1985

[54] METHOD AND APPARATUS FOR FILTRATION USING FERROMAGNETIC METAL FIBERS

[75] Inventors: Michiaki Hagiwara, Kyoto; Yoshitaka Tomohiro, Uji, both of Japan

[73] Assignee: Unitika, Ltd., Hyogo, Japan

[21] Appl. No.: 407,317

[22] Filed: Aug. 12, 1982

[30] Foreign Application Priority Data

Aug. 20, 1981 [JP] Japan ................. 56-131046

[51] Int. Cl.$^3$ ............................................ B01D 35/06
[52] U.S. Cl. .................................... 210/695; 210/795; 210/223; 210/508; 210/275; 55/3; 55/100; 428/288; 428/457
[58] Field of Search ............... 210/222, 223, 695, 794, 210/243, 795, 274, 504, 507, 275, 505, 506, 508; 428/285, 288, 297, 457; 55/526, 525, 486, 100, 3; 148/31.55

[56] References Cited

U.S. PATENT DOCUMENTS

| | | | |
|---|---|---|---|
| 879,930 | 2/1908 | Wiemann | 210/275 |
| 2,893,561 | 7/1959 | Duzich | 210/223 |
| 3,219,194 | 11/1965 | Schwartzwalder et al. | 210/508 |
| 3,539,509 | 11/1970 | Heitman et al. | 210/275 |
| 3,925,202 | 12/1975 | Hirs | 210/274 |
| 4,247,398 | 1/1981 | Mohri | 210/222 |
| 4,279,748 | 7/1981 | Inoue | 210/222 |
| 4,298,478 | 11/1981 | Watson et al. | 210/695 |
| 4,309,290 | 1/1982 | Heitkamp | 210/695 |

FOREIGN PATENT DOCUMENTS

| | | | |
|---|---|---|---|
| 1368615 | 6/1964 | France | 210/274 |
| 53-116570 | 10/1978 | Japan | 210/222 |
| 54-40365 | 3/1979 | Japan | 210/223 |
| 688229 | 9/1979 | U.S.S.R. | 210/222 |

Primary Examiner—Richard V. Fisher
Assistant Examiner—John W. Czaja
Attorney, Agent, or Firm—Barnes, Kisselle, Raisch, Choate, Whittemore & Hulbert

[57] ABSTRACT

A filtrating method for removing suspended solids from a liquid by passing the liquid through a layer of filter medium in a magnetic field, the filter medium layer comprising a collection of organic fibers and ferromagnetic metal fibers. Usual suspended solids and relatively large magnetic suspended solids are arrested by the organic fibers, while fine magnetic suspended solids are arrested by the ferromagnetic metal fibers subjected to the action of the magnetic field. The collection of fibers achieves a high filtration efficiency, has outstanding regeneration characteristics, withstands continued use and is therefore very useful as a filter medium.

12 Claims, 4 Drawing Figures

METHOD AND APPARATUS FOR FILTRATION USING FERROMAGNETIC METAL FIBERS

The present invention relates to a method and an apparatus for filtering liquids containing suspended solids including usual suspended particles and magnetic particles.

Filter cloth, sand, anthracite, etc. have been used as filter media for filtering liquids containing suspended solids. These filter media have a large number of minute liquid channels in a reticular arrangement but have difficulty in removing particles up to several $\mu$m in size.

Magnetic particles suspended in a liquid are adsorbed and separated off with use of a layer of filter medium uniformly filled with a ferromagnetic material, by passing the liquid through the layer in a magnetic field. This method, which is termed magnetic separation, is adapted to adsorb magnetic particles only and is therefore unsuited for filtering liquids containing usual suspended particles. While the filter medium layer must be filled with the ferromagnetic material to an increased degree so that all the magnetic particles including relatively large particles of more than several $\mu$m and smaller particles can be adsorbed by the ferromagnetic material within the separating apparatus, the method has the drawback of being unable to adsorb fine particle effectively although capable of adsorbing relatively large particles efficiently.

Accordingly, in order to completely remove suspended solids, there is the need to resort to a filtration method wherein filter cloth, sand, anthracite or like filter medium is used and conjointly to another filtration method wherein magnetic particles are separated by a ferromagnetic material in a magnetic field. In this case, there arises a problem as to the structure to be uniformly filled with the ferromagnetic material and the problem of necessitating an apparatus of enlarged scale.

An object of the present invention is to overcome the above drawbacks of the prior art and to provide a filtration method which is capable of removing suspended solids efficiently and which employs a filter medium usable continuously for a prolonged period of time and having outstanding regeneration characteristics.

To fulfill the object, the present invention provides a filtration method characterized in that a prefilt containing suspended solids is passed through a layer of filter medium in a magnetic field to remove the suspended solids from the prefilt, the filter medium layer comprising a collection of organic fibers and ferromagnetic metal fibers.

With this method, usual suspended particles and relatively large magnetic particles are removed by the organic fiber portions of the filter medium, while at the same time fine magnetic particles of up to several $\mu$m are selectively removed by the ferromagnetic metal fibers which are subjected to the action of the magnetic field. The method therefore achieves a high filtration efficiency.

Examples of useful organic fibers are natural fibers, regenerated fibers, synthetic fibers, etc. Especially useful are polyester, nylon, vinylon and like synthetic fibers in view of durability.

Examples of useful ferromagnetic metal fibers are ferritic stainless steel fibers, martensitic stainless steel fibers, stainless steel fibers having the two phases of austenite and ferrite, amorphous metal fibers consisting essentially of iron, nickel and/or cobalt, etc. Especially corrosion-resistant amorphous metal fibers having a high magnetic permeability and a low magnetic coercive force (up to 100 mOe) are suited for continued use for a prolonged period of time because they are free of the problem heretofore encountered with crystalline metal fibers, e.g. stainless steel fibers, in that the filter medium made of such fibers can not be regenerated satisfactorily owing to residual magnetization and further because they are free of corrosion due to their high resistance thereto. Typical of corrosion-resistant amorphous metal fibers having a high magnetic permeability and a low magnetic coercive force are preferably those of an alloy prepared by adding about 20% by weight of at least one of Si, B, P and C to Fe—Cr, Fe—Cr—Ni, Fe—Co, Fe—Cr—Ni—Mo, Fe—Cr—Mo, Ni—Cr—Mo or Ni—Co.

The ratio of the organic fibers to the ferromagnetic metal fibers to be combined therewith can be determined as desired in accordance with the properties of the liquid to be filtered, especially with the size and concentration of the magnetic particles suspended therein, etc. To achieve a sufficient filtration efficiency, however, it is required that at least 5% by weight of ferromagnetic metal fibers be present in the collection of fibers.

Examples of useful collections of fibers are mats, woven or knitted fabrics, nonwoven fabrics and nets of organic fibers and ferromagnetic metal fibers which are randomly mixed together or combined together in the form of a layer, lumps of organic and ferromagnetic short fibers which are interlocked randomly, and lumps of interlocked short organic fibers alone having ferromagnetic metal fibers adhered to or implanted in the lumps. Especially fibers lumps of any shape have outstanding regeneration characteristics because they are easily movable when the filter medium is washed, permitting effective separation of the suspended solids thereby arrested without releasing the constituent fibers.

Among fiber lumps of various forms, the lumps made of short organic fibers only and having ferromagnetic metal fibers adhered to or implanted in the surfaces of the lumps are advantageous to use from the viewpoint of removing magnetic particles, especially fine magnetic particles, with an improved efficiency. This is because the ferromagnetic metal fibers for arresting fine magnetic particles, when projecting from the lump surfaces, come into contact with the magnetic particles readily without the likelihood that the usual suspended solids and relatively large magnetic particles trapped in the interior of the fiber lumps will not interfere with the contact therebetween. The fine magnetic particles arrested on the surfaces of the fiber lumps are easy to separate by washing, so that such lumps have greatly improved regeneration characteristics.

Generally organic fibers have the characteristics of being easy to entangle to form a collection of very complex construction. The state of entanglement is dependent on the physical properties of the fibers, such as the thickness, length, Young's modulus, rigidity, density, coefficient of friction, etc. of the fibers, and the surface structure thereof. Various fiber lumps are therefore easily available in accordance with the contemplated use by selecting the fibers having the desired physical properties and surface structure.

Lumps of fibers can be prepared by supplying short fibers into an agitating tank filled with water to disperse the fibers in the water, and injecting a gas into the water or mechanically agitating the water to stir the fibers in turbulent flows. The fibers are bent and interlocked with one another by the agitation to form lumps. Preferably the short fibers are 5 to 50 mm in length and about 10 to 100 μm in diameter. The fiber lumps are preferably globular or ellipsoidal and 5 to 100 mm in maximum diameter.

Another object of the present invention is to provide a filtration apparatus which is adapted to practice the above filtration method favorably and which enables the filter medium to exhibit its outstanding regeneration characteristics advantageously.

The filtration apparatus of the present invention comprises a filter column, a support disposed at a lower portion of the interior of the filter column, a layer of filter medium formed on the support and comprising a plurality of fiber lumps each composed of short organic fibers and short ferromagnetic metal fibers, a filter medium spreading zone formed above the filter medium layer within the filter column, prefilt supply means disposed at an upper portion of the filter column, filtrate discharge means disposed at a lower portion of the filter column, an electromagnet provided outside the filter column and surrounding the filter medium layer, air injecting means disposed below the filter medium layer, and means for discharging from the filter column the suspended solids separated from the filter medium by washing.

Figure 1B:
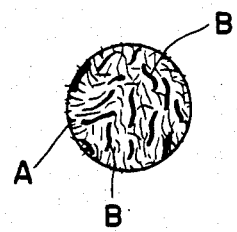
Figure 1C:
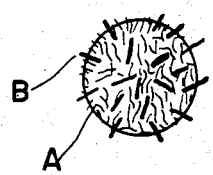
Figure 2:
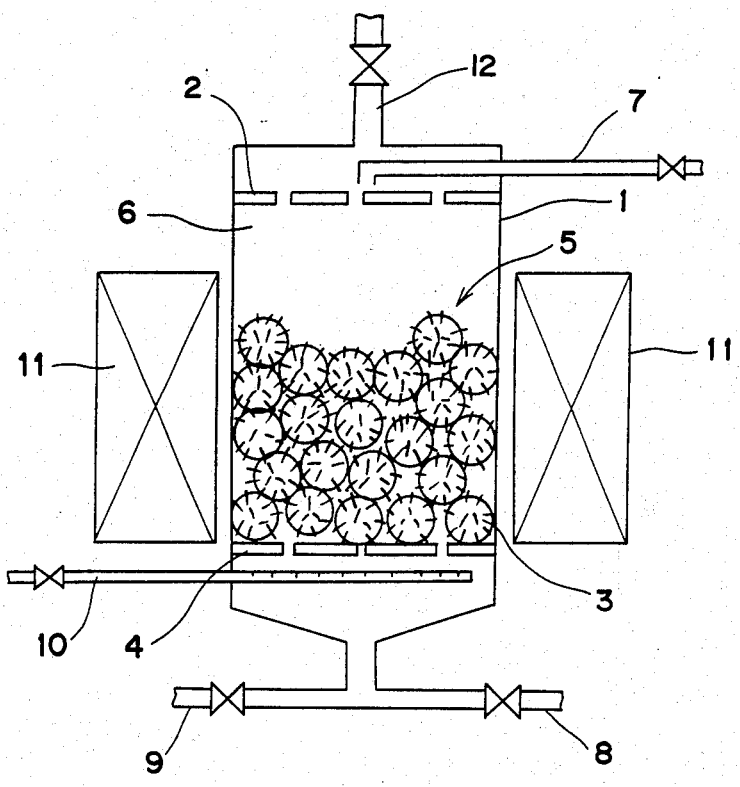

Various features and advantages of the invention will become apparent from the embodiments to be described below with reference to the accompanying drawings, in which:

FIG. 1a to FIG. 1c are views showing collections of fibers in various forms; and FIG. 2 is a diagram schematically showing a filtration apparatus according to the invention.

The filter medium to be used in this invention is a collection of organic fibers and ferromagnetic metal fibers. The fiber collection can be of various forms. For example, FIG. 1a shows a mat of organic fibers A and ferromagnetic metal fibers B which are mixed together randomly. FIG. 1b shows a globular lump of randomly interlocked short fibers of these two types. Further FIG. 1c shows a globular lump made of short organic fibers and having short ferromagnetic metal fibers implanted in the lump. As already stated, the fiber collection can be in other forms.

FIG. 2 shows an example of apparatus for practicing the filtration method of the invention. A filter column 1 of suitable diameter is internally provided with a water sprinkling perforated plate 2 at an upper portion and a perforated plate 4 at a lower portion for supporting a filter medium comprising globular lumps of fibers 3. The plate 4 has perforations smaller than the diameter of the fiber lumps 3. The fiber lumps 3 are accumulated on the perforated support plate 4 to form a layer 5 of filter medium. A filter medium spreading zone 6 is formed above the layer 5 as a space for spreading the filter medium when the medium is washed. The globular fiber lump 3 shown in FIG. 2 is made of interlocked short organic fibers and provided with corrosion-resistant amorphous metal fibers implanted in the surface of the lump and having a high magnetic permeability and a low magnetic coercive force. A prefilt supply pipe 7 having a stop valve is disposed at an upper portion of the filter column 1, while a filtrate discharge pipe 8 and a washing water supply pipe 9, each having a stop valve, are connected to the lower end of the column 1.

An air injecting pipe 10 is disposed below the perforated support plate 4. An electromagnet 11 is provided outside the filter column 1 for setting up a magnetic field completely covering the filter medium layer 5. Indicated at 12 is a wash drain pipe having a stop valve and connected to the upper end of the filter column 1.

With the filtration apparatus shown in FIG. 2, the perforations of the upper and lower perforated plates 2 and 4 within the filter column 1 preferably have such a small diameter that the fiber lumps 3 constituting the filter medium layer 5 will not pass therethrough with a liquid flow. While the filter medium layer 5 can be of any thickness required, it is desired that the thickness be at least 30 cm to assure a sufficient filtration efficiency and also to enable the fiber lumps 3 to form the filter medium layer 5 without any extreme irregularities in its thickness when accumulating again after washing. The height of the filter medium spreading zone 6, which can be determined suitably as required, must be at least one half of the thickness of the filter medium layer 5 to provide a space in which the fiber lumps 3 can spread freely for washing.

The magnetic field set up by the electromagnet 11 need not exceed 5 KOe in intensity to achieve satisfactory results.

The filtration apparatus shown in FIG. 2 is operated in the following manner. First, the stop valves on the air injecting pipe 10, the wash drain pipe 12 and the washing water supply pipe 9 are closed, the electromagnet 11 is energized, and the stop valves on the prefilt supply pipe 7 and the filtrate discharge pipe 8 are opened. The filter medium layer 5 compressed against the perforated support plate 4 by the pressure of a prefilt supplied arrests usual suspended solids and magnetic particles of relatively large sizes with the organic fibers and also arrests at the same time fine magnetic particles with the ferromagnetic metal fibers subjected to the action of the magnetic field. The resulting filtrate is discharged from the system through the discharge pipe 8.

To wash the filter medium, the stop valves on the prefilt supply pipe 7 and the filtrate discharge pipe 8 are closed, and the electromagnet 11 is de-energized. Subsequently the stop valves on the air injecting pipe 10, the washing water supply pipe 9 and the wash drain pipe 12 are opened. Compressed air is supplied to the injecting pipe 10, while washing water is fed by an unillustrated pump to the water supply pipe 9 and passed through the column 1 in a direction opposite to the direction of flow of the liquid during filtration. The air and the washing water coact within the filter column 1 to collapse the filter medium layer 5 from below, flow through the spaces between the fiber lumps 3 to gradually move and spread the fiber lumps 3 individually into the spreading zone 6, further flow along while releasing the arrested suspended solids from the lumps, and are run off from the system via the wash drain pipe 12. When the suspended solids have been completely discharged, the apparatus is operated again for filtration.

The filtration method of the present invention will be described with reference to the following examples which show the method more specifically as practiced and the results achieved.

Examples I and II

The filtration apparatus shown in FIG. 2 was used. The filter column 1 was in the form of a glass cylinder having an inside diameter of 300 mm. The distance from the water sprinkling perforated plate 2 to the perforated support plate 4 was 2200 mm. One of the filter media 3 described below was accumulated on the plate 4 to a height of 1000 mm from the plate 4 to form the filter medium layer 5. The space between the filter medium layer 5 and the plate 2 served as the filter medium spreading zone 6. The electromagnet 11 was 350 mm in inside diameter and 1050 mm in height and was adapted to set up a magnetic field of 3 KOe.

The prefilt used contained 100 mg/l of usual dust particles 10 to 30 μm in size, 100 mg/l of magnetic particles 10 to 30 μm in size, and 100 mg/l of magnetic particles 1 to 5 μm in size. The prefilt was filtered at a constant velocity of 30 m/h, and the concentration of suspended solids in the resulting filtrate was measured by weight.

The filter medium 3 used first was prepared by agitating short polyester fibers, 45 μm in diameter and 15 mm in length, in water to form globular fiber lumps, 20 mm in average diameter, and implanting 400 fibers of amorphous alloy, 130 μm in diameter and 22 mm in length, in each of the fiber lumps, the composition of the alloy being $Fe_{67}$—$Si_{10}$—$B_{15}$—$Cr_8$ (the subscript numbers represent atomic percentages) (Example I).

The second filter medium 3 was composed of globular fiber lumps, 20 mm in average diameter, which were prepared by mixing short polyester fibers of the same size as above with fibers of amorphous alloy of the same composition as above, 130 μm in diameter and 10 mm in length, and agitating the mixture in water (Example II).

Used for comparison were a filter medium comprising globular fiber lumps made only of the same short polyester fibers as above and having an average diameter of 20 mm (Comparison Example I), and another filter medium prepared by implanting 400 amorphous alloy fibers having the same size and composition as those used for Example I, in each of cork balls having a diameter of 5 mm (Comparison Example II).

The results of filtration obtained with use of these filter media are listed below.

| Example | Filter medium | Suspended solids concentration |
| --- | --- | --- |
| Example I | Organic fiber lumps implanted with amorphous alloy fibers | 4 mg/l |
| Example II | Lumps of organic fibers and amorphous alloy fibers | 13 mg/l |
| Comparison Example I | Lumps of organic fibers | 94 mg/l |
| Comparison Example II | Amorphous alloy fibers | 115 mg/l |

Examples I and II wherein the filtration method of this invention was practiced achieved very high filtration efficiencies. Especially Example I wherein the organic fiber lumps implanted with amorphous alloy fibers were used as the filter medium produced an outstanding effect in removing magnetic particles. However, fine magnetic particles were not removable in Comparison Example I, and little or no usual dust particles were removed in Comparison Example II.

Example III

Blast furnace dust collecting water containing fine particles of magnetite, hematite, iron, quartz, etc. in an amount of 500 mg/l was filtered by the same apparatus as used in Example I at a flow velocity of 45 m/h with use of the same filter medium as used in Example I. The resulting filtrate was found to contain suspended solids at a reduced concentration of 5 mg/l (removal efficiency: 99%).

For comparison, the same procedure as above was repeated with the exception of using a fiber medium prepared by randomly accumulating amorphous alloy fibers ($Fe_{67}$—$Si_{10}$—$B_{15}$—$Cr_8$, 130 μm in diameter) to a filling degree of 70%. The resulting filtrate was found to contain suspended solids at a concentration of 45 mg/l. This indicates that the method of the present invention is exceedingly superior in filtration efficiency.

What is claimed is:

1. A filtration method characterized in that a prefilt containing suspended solids is passed through a layer of filter medium in a magnetic field to remove the suspended solids from the prefilt, the filter medium layer comprising a collection of globular or ellipsoidal fiber lumps each formed by interlocking short organic fibers and having short corrosion-resistant amorphous ferromagnetic metal fibers adhered to the surface of the lump.

2. A filtration method characterized in that a prefilt containing suspended solids is passed through a layer of filter medium in a magnetic field to remove the suspended solids from the prefilt, the filter medium layer comprising a collection of globular or ellipsoidal fiber lumps each formed by interlocking short organic fibers and having short corrosion-resistant amorphous ferromagnetic metal fibers partially inserted into the lump so that the metal fibers project from the surface of the lump.

3. A method as defined in claim 1 or 2, wherein the organic fibers are natural fibers, regenerated fibers or synthetic fibers, or a desired combination thereof.

4. A filtration apparatus comprising a filter column, a support disposed at a lower portion of the interior of the filter column, a layer of filter medium formed on the support and comprising a collection of globular or ellipsoidal fiber lumps each formed by interlocking short organic fibers and having short corrosion-resistant amorphous ferromagnetic metal fibers adhered to the surface of the lump, a filter medium spreading zone formed above the filter medium layer within the filter column, prefilt supply means disposed at an upper portion of the filter column, filtrate discharge means disposed at a lower portion of the filter column, an electromagnet provided outside the filter column and surrounding the filter medium layer, air injecting means disposed below the filter medium layer, and means for discharging from the filter column the suspended solids separated from the filter medium by washing.

5. A filtration apparatus comprising a filter column, a support disposed at a lower portion of the interior of the filter column, a layer of filter medium formed on the support and comprising a collection of globular or ellipsoidal fiber lumps each formed by interlocking short organic fibers and having short corrosion-resistant amorphous ferromagnetic metal fibers partially inserted into the lump so that the metal fibers project from the surface of the lump, a filter medium spreading zone formed above the filter medium layer within the filter column, prefilt supply means disposed at an upper portion of the filter column, filtrate disharge means disposed at a lower portion of the filter column, an electromagnet provided outside the filter column and surrounding the filter medium layer, air injecting means disposed below the filter medium layer, and means for discharging from the filter column the suspended solids separated from the filter medium by washing.

6. An apparatus as defined in claim 4 or 5, wherein the organic fibers are natural fibers, regenerated fibers or synthetic fibers, or a desired combination thereof.

7. An apparatus as defined in claim 4 or 5, wherein a water sprinkling perforated plate is provided above the filter medium layer within the filter column to form the filter medium spreading zone between the plate and the layer.

8. An apparatus as defined in claim 4 or 5, wherein the filter column has a washing water supply pipe connected to its lower end and provided with a stop valve, and a wash drain pipe connected to its upper end, provided with a stop valve and serving as the means for discharging the suspended solids.

9. An apparatus as defined in claim 4 or 5, wherein the prefilt supply means comprises a prefilt supply pipe having an opening above the filter medium layer within the filter column and provided with a stop valve, and the filtrate discharge means comprises a filtrate discharge pipe connected to the lower end of the filter column and having a stop valve.

10. An apparatus as defined in claim 4 or 5, wherein the support comprises a perforated plate, and an air injection pipe having a stop valve and serving as the air injecting means is disposed horizontally below the perforated plate.

11. An apparatus as defined in claim 4 or 5, wherein the filter medium layer has a thickness of at least 30 cm.

12. An apparatus as defined in claim 4 or 5, wherein the filter medium spreading zone has a height at least one half of the thickness of the filter medium layer.

* * * * *